(12) United States Patent
Romunen

(10) Patent No.: US 7,489,115 B2
(45) Date of Patent: Feb. 10, 2009

(54) METHOD IN AN ELECTRIC NET DATA TRANSMISSION SYSTEM FOR KEEPING THE SIGNAL LEVEL CONSTANT IN A COUPLING FURNISHED WITH SUPPLY CABLE

(76) Inventor: Jorma Kullervo Romunen, Kauriinpelto T 170, FI-33880, Lempäälä (FI)

( * ) Notice: Subject to any disclaimer, the term of this patent is extended or adjusted under 35 U.S.C. 154(b) by 365 days.

(21) Appl. No.: 10/551,389

(22) PCT Filed: Mar. 30, 2004

(86) PCT No.: PCT/FI2004/000184

§ 371 (c)(1),
(2), (4) Date: Sep. 29, 2005

(87) PCT Pub. No.: WO2004/088870

PCT Pub. Date: Oct. 14, 2004

(65) Prior Publication Data

US 2006/0220691 A1    Oct. 5, 2006

(30) Foreign Application Priority Data

Mar. 31, 2003  (FI) .................................. 20030471

(51) Int. Cl.
*G05F 1/70* (2006.01)
(52) U.S. Cl. ........................................ 323/208; 327/89
(58) Field of Classification Search .................. 327/50, 327/87, 89, 91; 455/572; 324/605, 606; 323/208, 364

See application file for complete search history.

(56) References Cited

U.S. PATENT DOCUMENTS

| 4,451,801 | A | 5/1984 | Monticelli |
| 6,020,787 | A | 2/2000 | Kim et al. |
| 6,046,594 | A * | 4/2000 | Mavretic ................. 324/520 |
| 6,239,617 | B1 | 5/2001 | Guertin et al. |

FOREIGN PATENT DOCUMENTS

| DE | 199 40 544 A1 | 3/2001 |
| EP | 0 267 887 | 5/1988 |
| EP | 1 089 453 A1 | 4/2001 |

* cited by examiner

*Primary Examiner*—Jessica Han
(74) *Attorney, Agent, or Firm*—Stites & Harbison PLLC; Ross F. Hunt, Jr.

(57) ABSTRACT

Method in low voltage net data transmission system for keeping the signal level of transmission constant on the net voltage rail or on wall outlet. In the method the feedback signals are taken wired or wirelessly from one or some locations of the actual apparatus or supply cable to the measuring and handling unit (60) of transmitting signals and further to the process unit (70) of sample and holding circuits (S & H) or of corresponding means and control means (CONTROL), by which unit the control signal ($U_{RC}$) and/or $U_{LC}$) is taken to steer the output signal or output voltage of blocks (10, 20, 40 and/or 50) in a depending way from load impedance ($Z_{LOAD}$) and from the series impedance ($Z_W$) of supply cable ($L_W$) so that the amplitude ($U_{LOAD}$) of transmission signal level ($\underline{U}_{LOAD}$) on voltage rail or some location of the supply cable or on wall outlet is constant or almost constant.

4 Claims, 7 Drawing Sheets

METHOD IN AN ELECTRIC NET DATA TRANSMISSION SYSTEM FOR KEEPING THE SIGNAL LEVEL CONSTANT IN A COUPLING FURNISHED WITH SUPPLY CABLE

The common problem with data transmission in a low voltage net, for example 12 VAC/DC, 24 VAC/DC, 48 VAC/DC, 115 VAC, 230 VAC and 400 VAC, is the weakening of the transmission signal due to the connecting cable and due to the load impedance, for instance only a fraction of signals sent by the transmitter gets between the phase rail and the zero rail. The problem is most severe when the connecting cable is long and when the load impedance at used signal frequencies is very low. Among other things, this problem can prevent commercial profiting of net data transmission systems.

The invention removes the problem by eliminating the impact of the weakening on coupling capacitor $C_C$ and of the connecting cable with the small values of load impedance. Thus the standard-allowed maximum signal SFS-EN-50065-1:122 dBuV is produced between the phase rail and the zero rail and in this respect data transmission in a low voltage net is made reliable even with low net impedance $\underline{Z}_{LOAD}$.

Even in the most advanced solutions of the present technique, where the output signal of the apparatus is constant, in other words independent of the net impedance, the coupling capacitor $C_C$ and connecting cable cause weakening of the transmission signal. The situation is especially bad when the net impedance is very low.

BRIEF DESCRIPTION OF THE DRAWINGS

FIG. 1 shows the weakening of the transmission signal by a 3 meter connecting cable. Thereby the weakening is about 7 dB; but if the length of the connecting cable is for instance 10 m, the weakening is about 14 dB (⅕ voltage) when the load impedance $Z_{LOAD}$ is 1 ohm.

Figure 1:
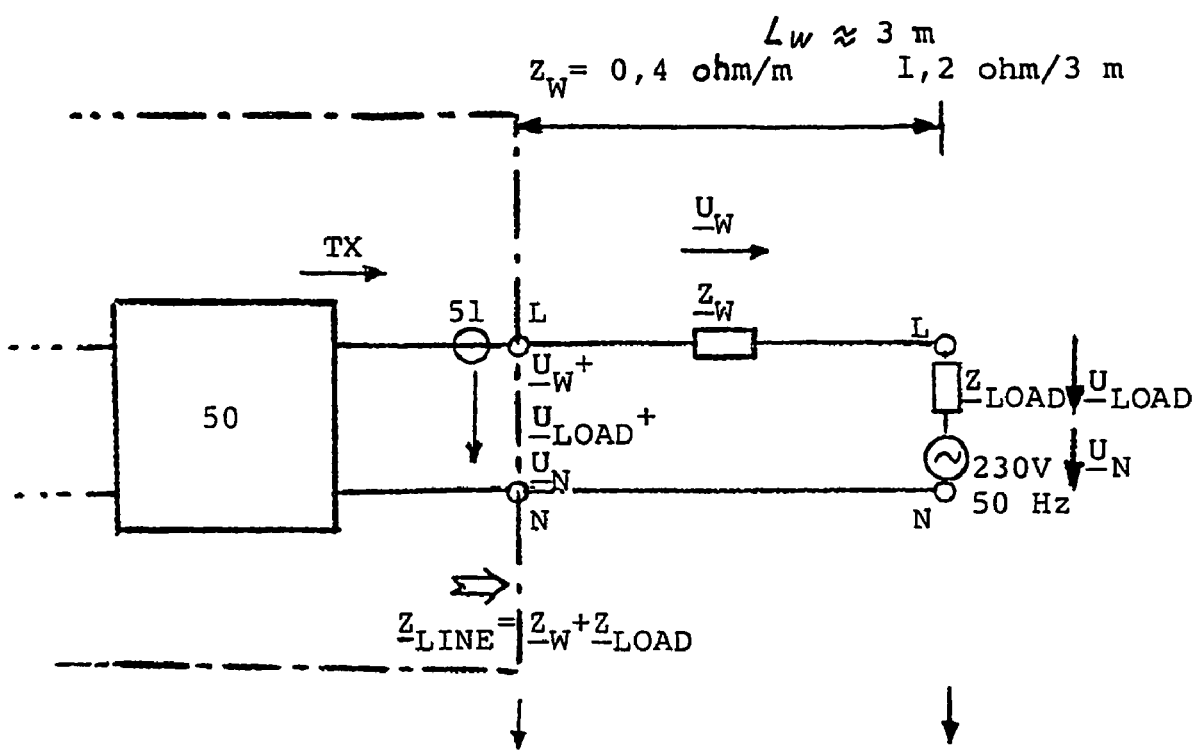
FIG. 1 is a circuit diagram showing the weakening of a transmission signal by a 3 meter supply cable.
Figure 2:
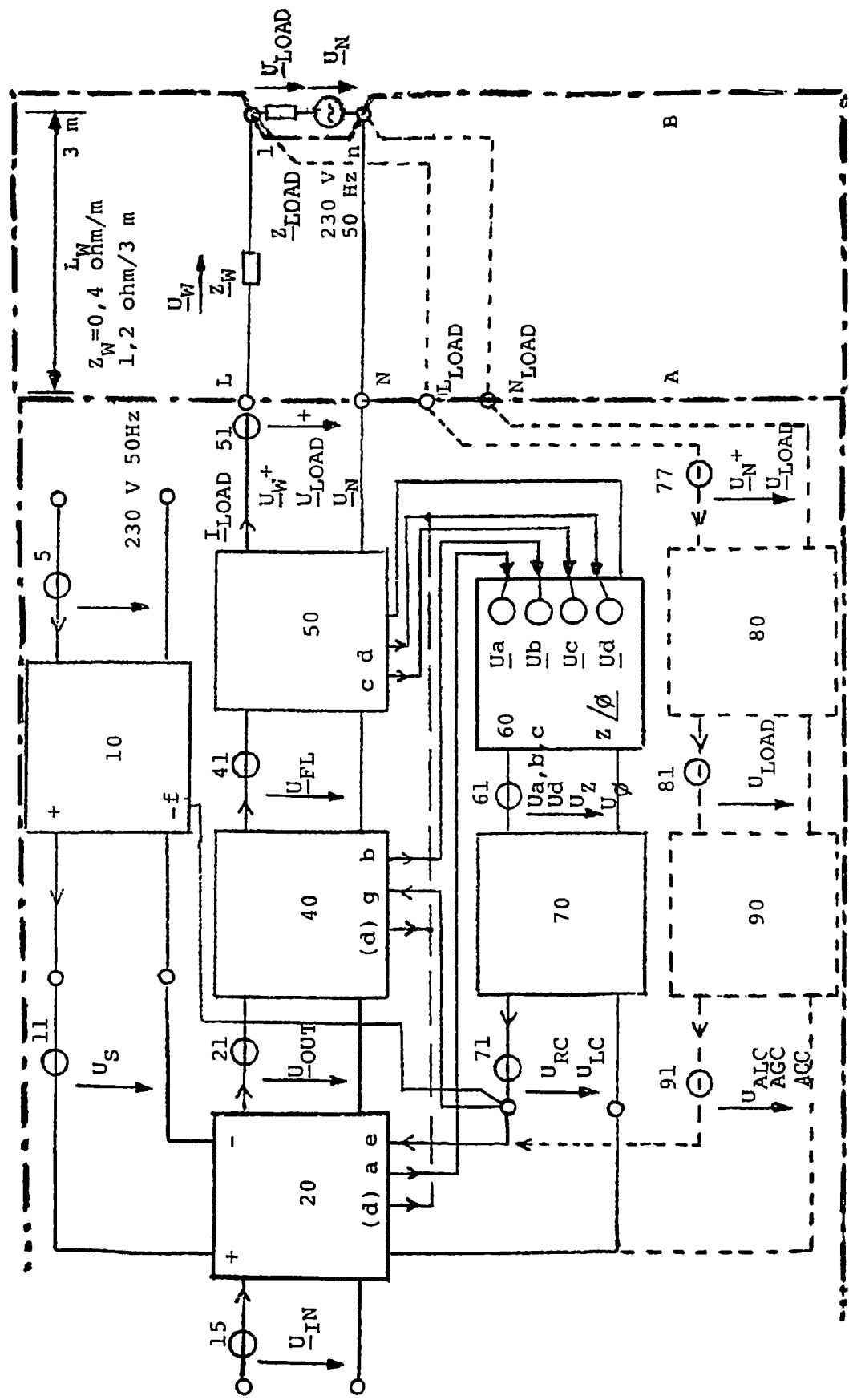
FIG. 2 is a block diagram showing a low voltage net data transmission system in accordance with the present invention.

The block diagram of the whole invention is presented in FIG. 2. The voltage source 10 is the source of supply voltage furnished with constant or adjustable output voltage $U_S$. $U_S$ is the supply voltage of signal amplifier 20.

Input signal $\underline{U}_{IN}$ (e.g., under 95 kHz, 95-125 kHz, 125-140 kHz or 140-148.5 kHz) can be a sinus or a square signal to its amplitude, e.g. 5 $V_{PP}$. The input signal is taken by adjustable amplification or, after signal amplifier 20, furnished with level regulation $\underline{U}_{OUT}$ to low pass or band pass signal filter 40, where harmonic distortion (crack) signals are filtered out from the basic frequency signal. Filtered signal $\underline{U}_{FL}$ is then taken to coupling unit 50 and further to the low voltage net, e.g., with a 3 meter connecting cable.

The network impedance between the phase rail and zero rail, the rail impedance, is described by signal frequencies with load impedance $\underline{Z}_{LOAD}$. The series impedance of the connecting cable is described with impedance $\underline{Z}_W$. The connecting cable length is $L_W$.

Dotted broken line A illustrates the traditional idea of the transmitting apparatus, which has an output connector O reference number 51: L-N. Dotted broken line B illustrates an expanded idea of the transmitting apparatus according to this invention. Then the connecting cable is a fixed part of the apparatus and the output terminals of the apparatus, expanded as per this idea, is the connecting cable ends 1-n to be connected to the phase and the zero rail. The connecting cable length must be of the prior art as well as its electric and other properties.

The basic idea of this invention is that a connecting cable of certain length and type $L_W$, $\underline{Z}_W$ is a fixed part of the transmission apparatus and between cable ends 1-n, coupled to the network phase rail and zero rail, the rail voltage $U_{LOAD}$ is kept constant by means of feedback coupling. The output coupling L-N of the transmitting apparatus is at the same time a phase and zero rail connection. In this way the transmission signal $\underline{U}_{LOAD}/\underline{Z}_{LOAD}$ amplitude $U_{LOAD}$, which must be put in between phase and zero rail, is constant.

The internal generator impedance of the signal generator, formed by the transmitter and connecting cable, can in this way be formed almost to a rate of 0 ohm.

The invention is not in contradiction for instance with standard SFS-EN 50065-1, since the load voltage $U_{LOAD}$ between the phase rail and zero rail or in the wall outlet does not under any circumstances exceed the allowed rate 122 dBuV. The same result could be reached also without the invention if the length of connecting cable would be, for instance, only 10-20 cm. Generally, in practice it would, however, be impossible to use such a short length.

OPERATION ALTERNATIVE 1. BLOCKS 60 AND 70 a) Virtual Impedance Method

Steered before actual data transmission by micro processor $_\mu P$ included in process unit 70, the signal amplifier 20 transmits a reference level signal of short duration, e.g., 40 ms, in such a way that the signal amplifier always receives its constant control voltage $U_{RC}$ (RC=REFERENCE CONTROL) from the process unit 70. The level of $U_{RC}$ is such kind that from a load impedance $\underline{Z}_{LOAD}$=50 ohm, a transmission signal $\underline{U}_{LOAD}$ in size of e.g. 3.56 $V_{PP}$ would be reached. $U_{LC}$ is out of function.

During transmission, the load impedance (rail impedance) $\underline{Z}_{LOAD}$ is what it happens to be at that moment. Measuring and handling unit 60 measures the feedback signal $\underline{U}_a$ from block 20, $\underline{U}_B$ from block 40 or $\underline{U}_C$ from block 50 and $\underline{U}_D$ from block 50. The feedback signal voltages $\underline{U}_a$, $\underline{U}_b$ or $\underline{U}_c$ are lower the lower that $\underline{Z}_{LOAD}$ is. The primary current $I_C$ in coupling unit 50 of signal transformer $T_C$ is measured by measuring the signal voltage $U_d$ over series resistor R=0.5 ohm. $\underline{I}_C$ is thus higher the lower that the $\underline{Z}_{LOAD}$ is.

Alternatively, instead of the above $I_C$ of the signal current, it is also possible to measure the secondary current $\underline{I}_{LOAD}$ of the signal transformer $T_C$, which current runs through coupling capacitor $C_C$ to the connecting cable and further to load impedance $\underline{Z}_{LOAD}$. The signal voltage $U_D$ to be measured is proportional to signal current $I_C$ or $I_{LOAD}$. If the $\underline{I}_{LOAD}$ is measured from the secondary side before or after the coupling capacitor $C_C$, still a separate coupling unit is needed for coupling of signals $\underline{U}d$ and $\underline{U}c$ to measuring and handling unit 60.

Alternatively signal voltage $\underline{U}d$ can instead of coupling unit 50 be measured from signal amplifier 20 or signal filter 40. Signal voltage Ud gives information of signal current $\underline{I}_{LOAD}$ in the transmission situation.

The phase angle Ø between $\underline{U}a$, $\underline{U}b$, $\underline{U}c$ and $\underline{I}c$ depends on the phase angle of $\underline{Z}_{LOAD}$, in other words to what extent the $\underline{Z}_{LOAD}$ is resistive, capacitive or inductive. Measuring and handling unit 60 includes a phase difference detector and signal handling circuits and a lot of screening. On the basis of the above data in measuring and handling unit 60, for instance, the following variables are calculated:

$Z=Ua/Ic$, $Ub/Ic$ or $Uc/Ic$ ohm $Z/\underline{\emptyset}=\underline{Z}$ $\emptyset=(\underline{U}a, \underline{I}c$ or $\underline{U}b, \underline{I}c$ or $\underline{U}c, \underline{I}c)$ Impedance $\underline{Z}$ is a kind of a virtual impedance, which gives knowledge of the load impedance $\underline{Z}_{LOAD}$.

In measuring and handling unit 60, direct voltages $U_Z$ and $U_\emptyset$ proportional to measured virtual impedance modulus value Z and phase angle Ø are formed and taken to process unit 70 of the microprocessor that by means of $U_{LC}$ memory map transforms them to control voltage $U_{LC}$ to control the amplification of signal amplifier 20 so that load signal voltage $U_{LOAD}$ is constant and the maximum allowable, e.g., 3.56 $V_{PP}$ or 122 dBuV. $U_{LC}$ remains in the holding circuit of process unit 70 till after about 1-4 seconds, at which time it gets removed by a new $U_{CL}$ value determined by the next new reference measuring (LC=LEVEL CONTROL).

All in all, always, for instance for 2 ms-20 s, e.g., 40 ms, the apparatus sends a transmission signal according to certain reference level, for instance at intervals of 0.5 s-30 s, e.g. 1-4 s. During the mentioned 40 ms, a virtual impedance $\underline{Z}=Z/\underline{\emptyset}$ somehow proportional to the modulus value and phase angle of load impedance $\underline{Z}_{LOAD}$ is determined, the variables $U_Z$ and $U_\emptyset$ determined by which there is picked from the $U_{LC}$ memory map, FIG. 6, an $U_{LC}$ control voltage to control the amplification of signal amplifier 20 so that the load signal voltage $U_{LOAD}$ is constant, e.g., 3.56 $V_{PP}$ with the load impedance in question.

b) Amplitude Method

Alternatively, for the above presented virtual impedance method (Z∠Ø), the control voltage $U_{LC}$ of signal amplifier 20 can be formed simply by means of transmission signals $\underline{U}a$, $\underline{U}b$ or $\underline{U}c$, and by means of $\underline{U}d$ amplitude monitoring.

The transmitting apparatus, reckoned from signal amplifier 20 and advancing through the low pass and/or band pass signal filter 40 and the coupling unit 50 to the connecting cable and finally further to the load impedance $\underline{Z}_{LOAD}$, includes capacitors, resistors, chokes, a transformer and other inductances and capacitors. Accordingly, by means of different load impedance $\underline{Z}_{LOAD}$ values, it is possible to measure from different locations in the apparatus transmission signals of different value (Ua,Ub,Uc,Ud) as to their amplitude. For instance, on basis of amplitude combinations of two signals, as Ub and Ud, the value and nature of load impedance $\underline{Z}_{LOAD}$ can be concluded. It is the question of an amplitude method as an alternative to the virtual impedance method.

FIG. 2: Block diagram of the whole invention and FIG. 6: $U_{LC}$ memory map=$U_{LC}$ (Z, Ø).

With control voltage $U_{LC}$ it is possible in addition to block 20 or alternatively to control block 40, 50 and/or block 10. The same also concerns control voltage $U_{RC}$.

OPERATION ALTERNATIVE 2: BLOCKS (80 AND 90)

Feedback coupling is taken from the phase rail and zero rail. Rail signal voltage is load signal voltage $\underline{U}_{LOAD}/\underline{Z}_{LOAD}$ ($I_{LOAD}$-$n_{LOAD}$) or from the wall outlet through coupling unit/feedback 80 to the ALC/ALG/ACC unit 90, where control signal $U_{ALC}$ or $U_{AGC}$ or $U_{ACC}$ is formed to control the output signal level $U_{OUT}$ of signal amplifier 20 so that load signal voltage $U_{LOAD}$, i.e., rail signal voltage Ul-n is constant, in other words independent of the load impedance $\underline{Z}_{LOAD}$.

ALC=Automatic Level Control
AGC=Automatic Gain Control
ACC=Automatic Cutting Control Control voltage $U_{ALC}$, $U_{AGC}$ and/or $U_{ACC}$ can in addition to signal amplifier 20 alternatively control block 40, 50 and/or block 10. The same is in question also with control voltage $U_{RC}$.

The coupling unit 50 and the coupling unit/feedback 80 include, in case of galvanic separation, a coupling transformer $T_C$ and $T_{CC}$ and a coupling capacitor $C_C$ and $C_{CC}$ and possibly also other components. Alternatively there is a so called direct coupling no galvanic separation from the network, and the coupling units 50 and 80 can in their simplicity include only a coupling capacitor $C_C$ and $C_{CC}$.

Figure 3:
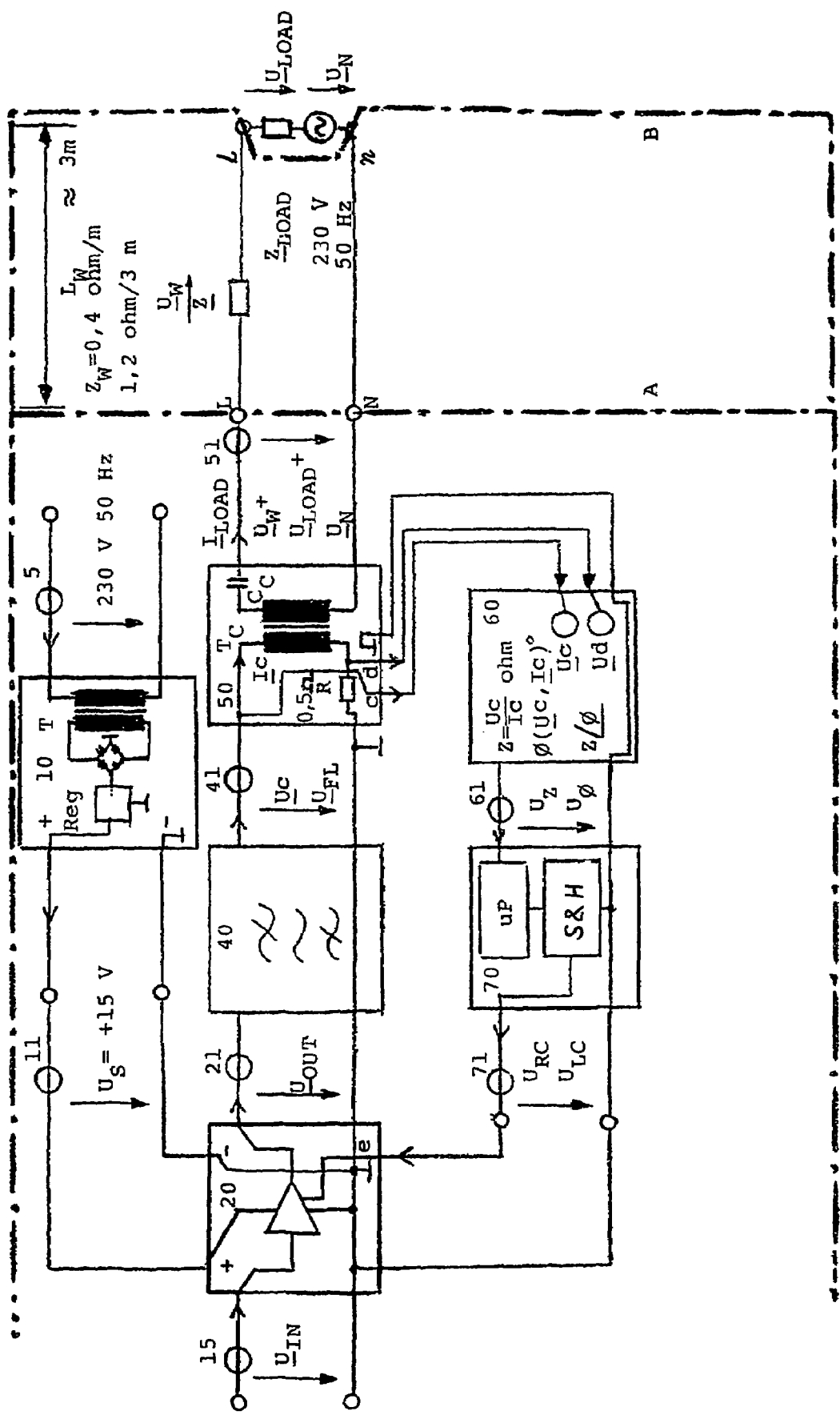
FIG. 3 shows a first application of the present invention using a virtual load impedance method.

The First Application of the Invention. FIG. 3

FIG. 3 shows first application of the invention. The operating principle is already described above. In connection with $U_{LC}$ memory map, FIG. 6, it can be stated that it presents the control voltage values $U_{LC}$ of the signal amplifier 20 corresponding to 304 different load impedance $\underline{Z}_{LOAD}$ values, by means of which it is then possible to bring about to the load impedance in question a constant load signal voltage $U_{LOAD}$ 3.56 $V_{PP}$ or 122 dBuV.

In addition to the $\underline{Z}_{LOAD}$ of impedances, it presents the $\underline{Z}=Z\angle\emptyset$ values Z and Ø of the measured virtual impedance, as addresses of the storage location, and the $U_{LC}$ value as content of said storage location. The virtual impedance $\underline{Z}$ is, in addition to coupling unit 50, also affected by blocks 20 and 40 preceding it and by the connecting cable. Accordingly, the virtual impedance does not give any good linear picture of load impedance $\underline{Z}_{LOAD}$, especially in so far as the phase angle Ø is concerned. This is due to the fact that from signal amplifier 20 to load impedance $\underline{Z}_{LOAD}$ there are chokes, a transformer, capacitors and a connecting cable, by the interaction of which there are phase distortions as well as different resonance effects. One brilliant idea of the invention is that its above mentioned circumstances are of no importance at all, since it is enough that the virtual impedance in some way depends only on the $\underline{Z}_{LOAD}$ and the connecting cable, and only in some way differing virtual impedance values Z and Ø are produced and by this means $U_{LC}$ memory map addresses Z and Ø. Then into an appropriate storage location such a control voltage value $U_{LC}$ of the signal amplifier is stored, so that by means of it a proper output signal voltage $U_{OUT}$ of the signal amplifier and a constant load signal voltage, rail signal voltage $U_{LOAD}$ to the appropriate load impedance $\underline{Z}_{LOAD}$ is produced.

The invention functions by dotlike frequencies or by a certain frequency band. An $U_{LC}$ memory map is always needed for frequencies or frequency bands far enough from one another and for different connecting cables. If the virtual impedance is not exactly the same as some storage location address, the closest or a more proper address is chosen.

In the $U_{LC}$ memory map there can be more or even less than 304 storage locations. In practice, a whole swarm of memory maps may be needed. If a sufficient amount of connecting cables of different length and type are used and with frequencies or frequency bands far enough from one another for each case, a unique $U_{LC}$ memory map is needed. Instead of the 3 m length, the connecting cable can be even longer, but then it may be necessary to increase the supply voltage Us of signal amplifier 20.

The value tolerances of the transmitter components must be small enough precision components or then by each entire transmitter unit an $U_{LC}$ memory map is programmed in a special programming location individually by serial production. This applies to this and the next practical application.

Figure 4:
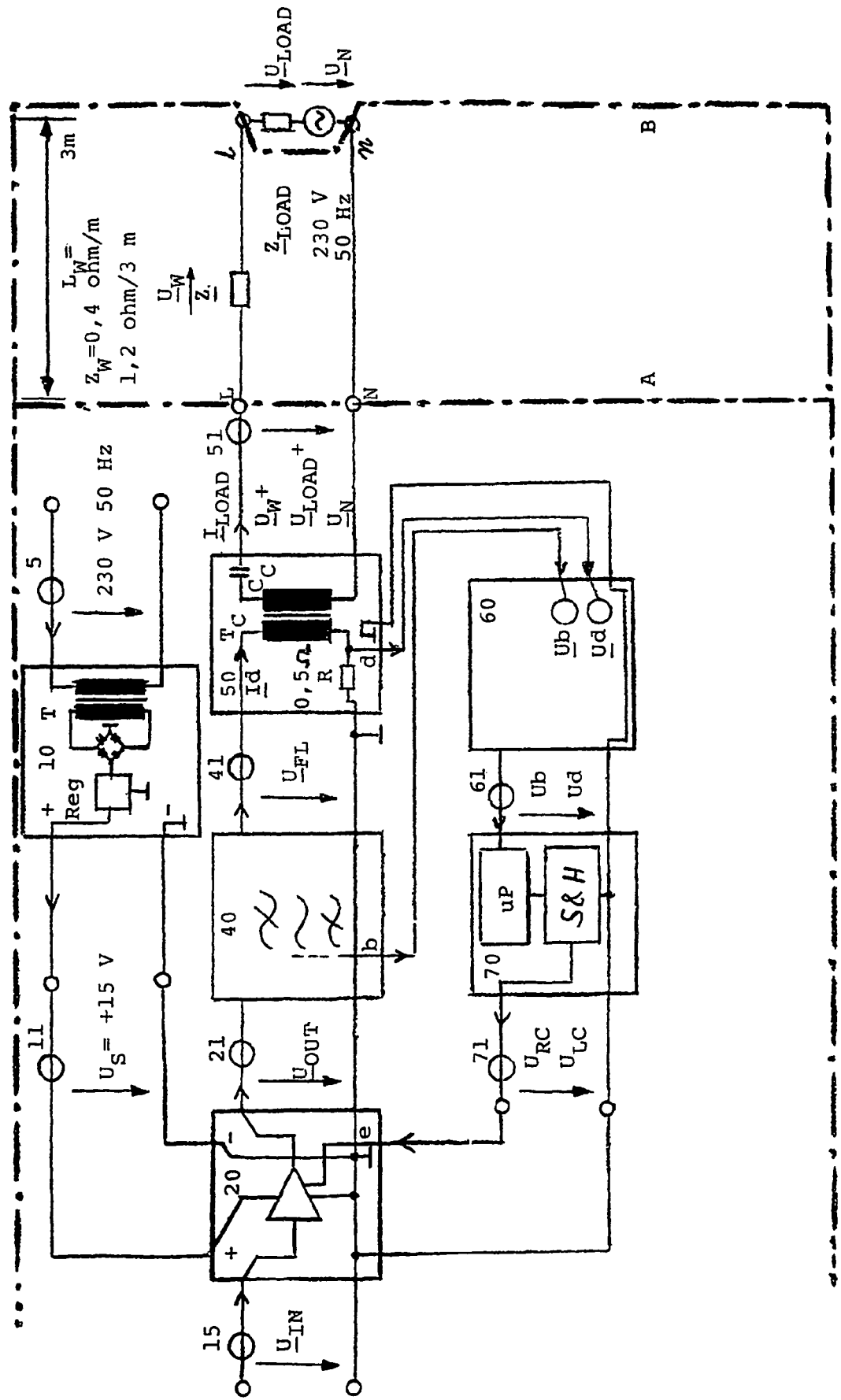
FIG. 4 shows a second application of the present invention using an amplitude method.

The Second Application of the Invention. FIG. 4

Instead of the virtual impedance method, the amplitude method can be used in order to generate a control voltage $U_{CL}$. In the amplitude method, it is possible to determine, on basis of two, for instance Ub and Ud signal voltage amplitudes, from the $U_{LC}$ memory map $U_{LC}=U_{LC}$ (Ub and Ud), a control voltage $U_{LC}$ corresponding to load impedance $\underline{Z}_{LOAD}$ which regulates the output signal amplitude $U_{OUT}$ in signal amplifier 20 so that load signal voltage $U_{LOAD}$ is constant, in other words e.g., 3.5 $V_{PP}$ or 122 dBuV. Quite clear differences have been measured for Ub and Ud, when $Z_{LOAD}=1$-50 ohm and $\emptyset_{LOAD}=0$-±90°; Ubmax-Ubmin=6 $V_{PP}$ and Udmax-Udmin=310 m$V_{PP}$/0.5 ohm. The Ub and Ud amplitude can be measured by an A/D transformer, 10 and 8 bits, during transmitting of the reference signal, i.e., output signal voltage $U_{OUT}$ in signal amplifier 20 is constant, for instance 40 ms/1-4 seconds.

The bit figure 10+8 received from A/D transformer, corresponding to Ub and Ud, can function directly as an address of the memory map. From the storage location indicated by it, a control voltage $U_{LC}$, proper for the situation, is reached for signal amplifier 20 by means of the sample and hold circuit in process unit 70. From $U_{LC}$ memory map, the closest or more proper address is chosen if the measured address is not exactly the same. Instead of the A/D transformer, comparator circuits can be used to measure the Ub and Ud levels of transmitted signals by steps.

Figure 6:
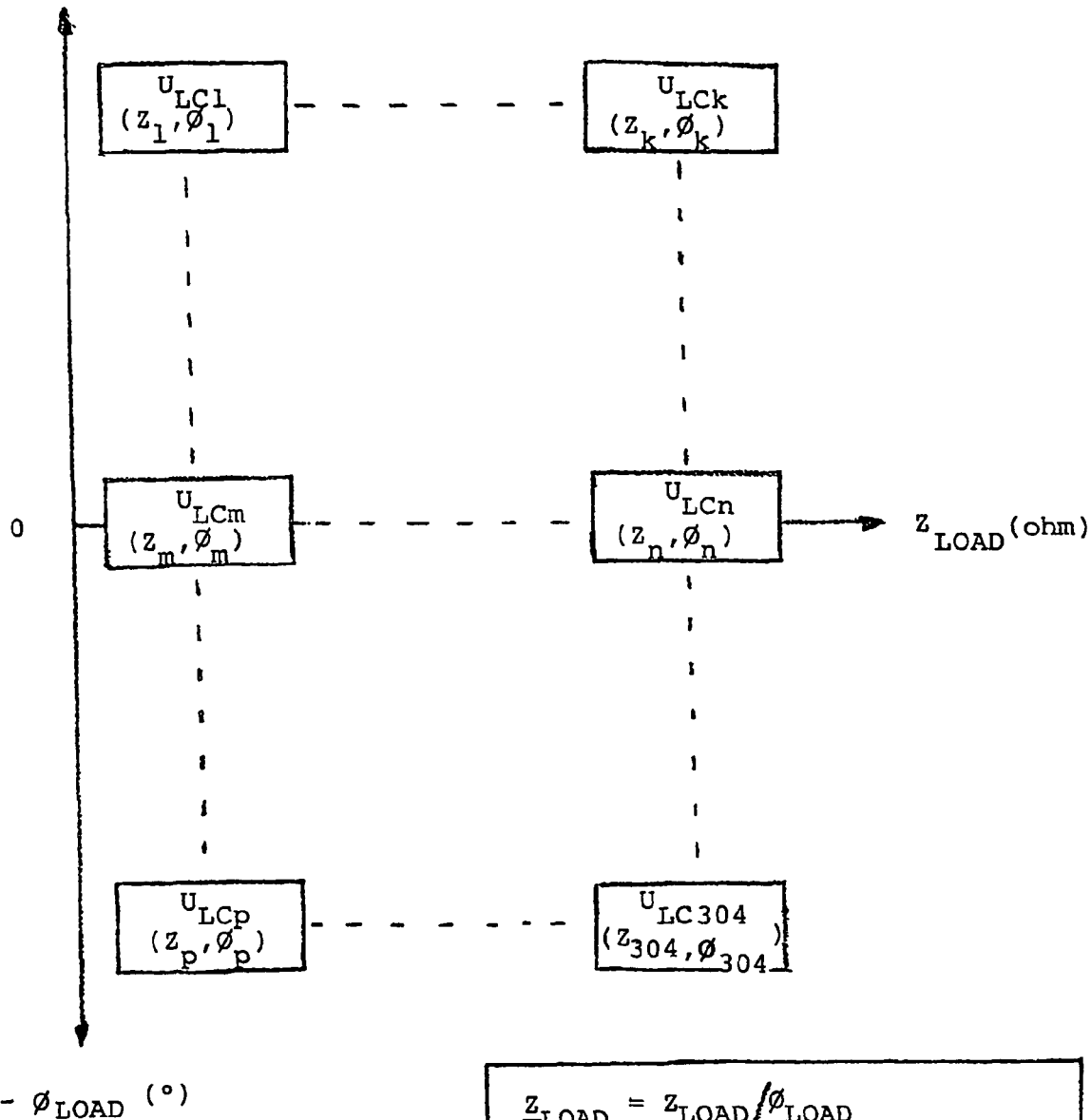
FIG. 6 shows a $U_{LC}$ memory map according to the present invention.

The $U_{LC}$ memory map presented in FIG. 6 is suited also for this application of the invention and if the address co-ordinates Z and Ø of the storage locations are correspondingly transformed into Ub and Ud, $U_{LC}=U_{LC}$ (Ub, Ud).

Figure 5:
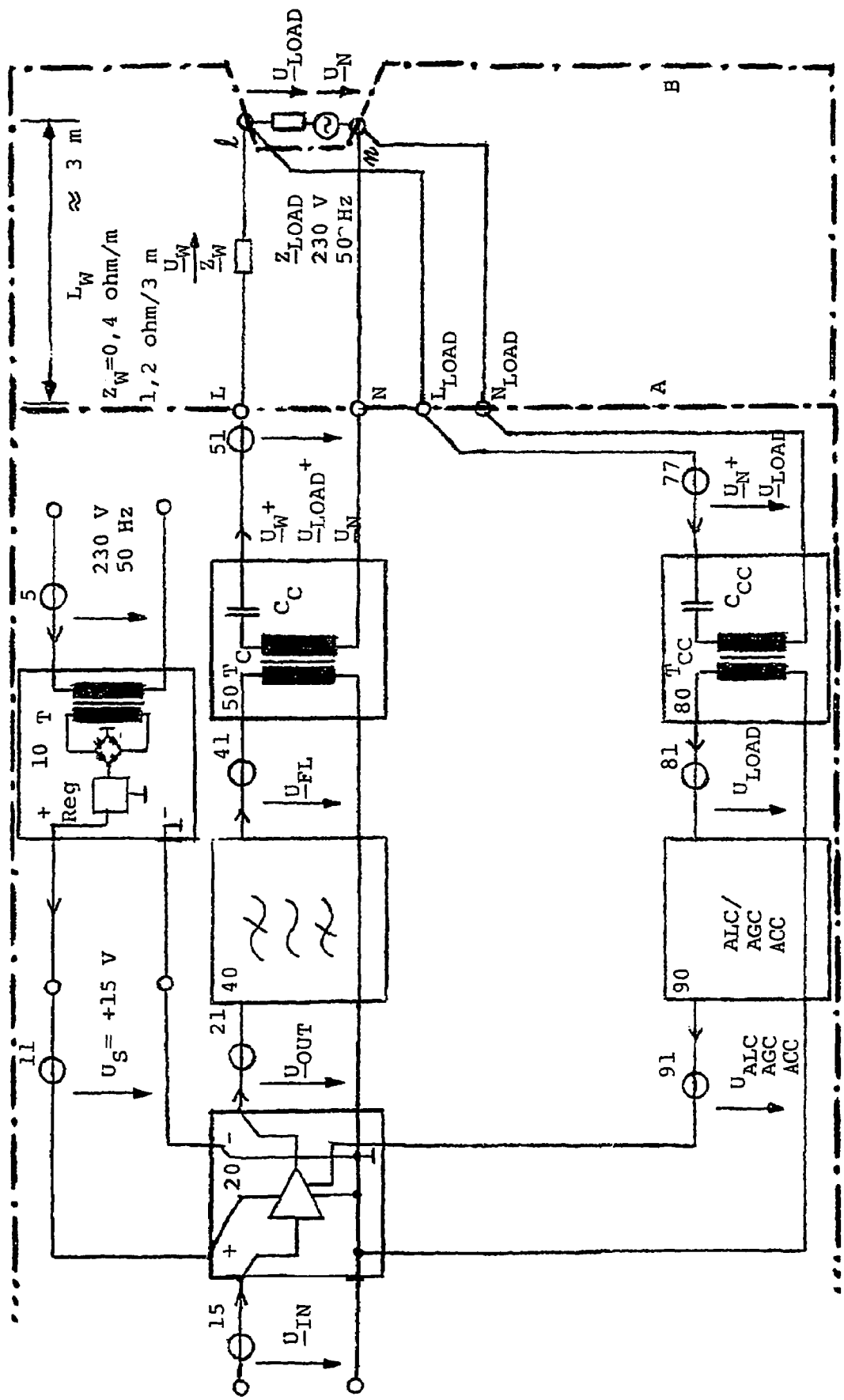
FIG. 5 shows a third application of the present invention using a feedback coupling method.

The Third Application of the Invention. FIG. 5.

Figure 7:
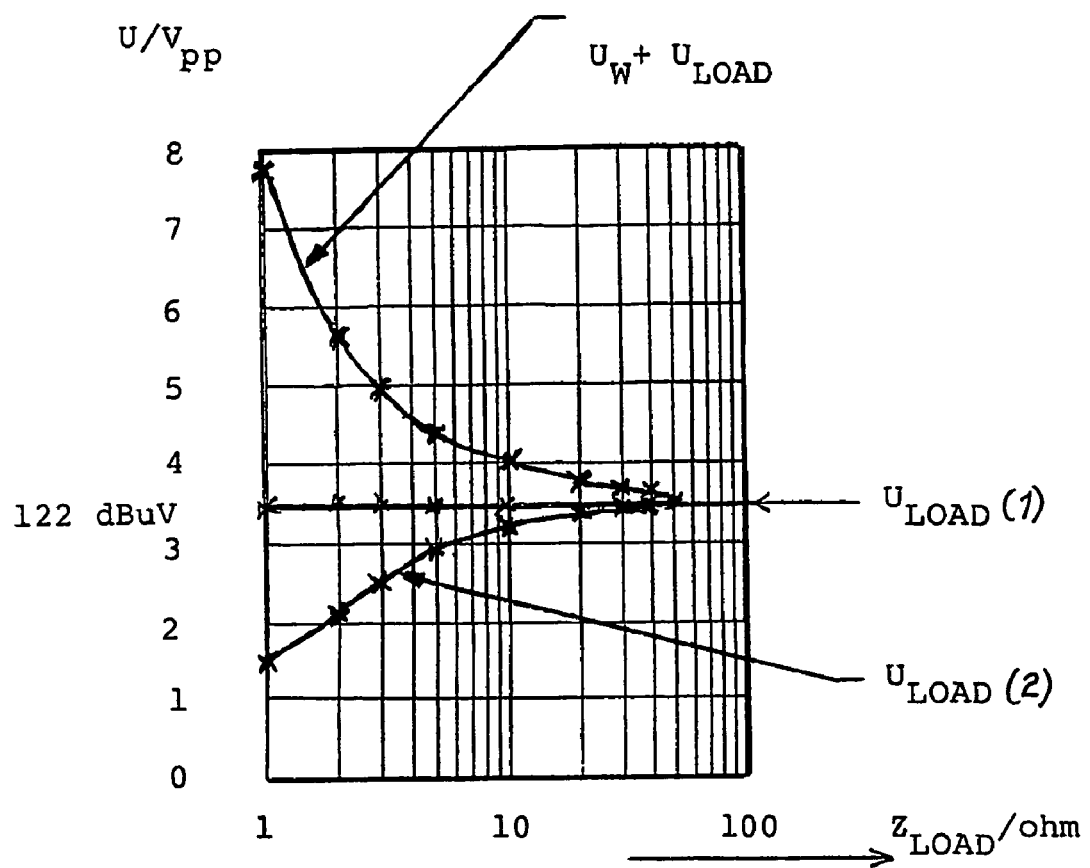
FIG. 7 is a graphical representation showing shows load signal voltage with feedback coupling and without feedback coupling as a function of load impedance during transmitting.

FIG. 7 shows load signal voltage $U_{LOAD}$ (1) with feedback coupling with blocks 80 and 90 and (2) and without feedback coupling $U_{LOAD}$ as a function of load impedance i.e., rail impedance $Z_{LOAD}$ during transmitting. The output signal of the real apparatus is $U_W + U_{LOAD}$ in net connector 51, L-N with feedback coupling.

Previously known is that the longer the connecting cable $L_W$, $Z_W$ of the transmitter of a data transmission system in a low voltage net, and the lower the impedance by signal frequencies in the other end of connecting cable as load impedance, rail impedance or net impedance $Z_{LOAD}$, the lower the load signal voltage $U_{LOAD}$ over $Z_{LOAD}$ during transmitting.

However, previously no effective means were known on how to eliminate the strong weakening of signal caused by the above mentioned circumstances. The problem does not vanish in that the transmitter maintains to keep the signal level constant in its output connector.

OPERATION ALTERNATIVE 1: FIGS. 3 AND 4

In the transmitting situation when output signal voltage $U_{OUT}$ in signal amplifier 20 is constant, the reference signal is sent repeatedly but of short duration and during that time one or more transmission signals Ua,b,c ... Un are measured from different locations of the apparatus i.e., apparatus+connecting cable. Then signal amplitudes, phase shifts (keying), proportions, multiplies, sums and other features are handled and calculated and the control signal $U_{LC}$ from processor unit 70 controls blocks 20, 40, 10 and 50 so that load signal voltage $U_{LOAD}$ is constant, in other words independent of load impedance $\underline{Z}_{LOAD}$ till the transmitting of the next reference signal that load signal voltage $U_{LOAD}$ is constant, in other words independent of load impedance $\underline{Z}_{LOAD}$ till the transmitting of the next reference signal. Signals Ua-Un, $U_Z$, $U_\emptyset$, $U_{RC}$, $U_{LC}$, $U_{ALC}$, $U_{ACC}$ and $U_{AGC}$ can instead of the voltage signal be current signals, frequency signals, code signals, electric field signals, magnet field signals, optical signals, electromagnetic signals and/or signals of other possible types.

OPERATION ALTERNATIVE 2

In the transmitting situation, the feedback signal $U_{LOAD}$ i.e., $U_{l-n}$ is taken directly from the rail impedance $\underline{Z}_{LOAD}$ connecting points 1-n or near the connecting points, usually from the phase and zero rails. The feedback signal is brought to coupling unit/feedback 80 by separate conductors and further to ALC/AGC/ACC unit 90, where control voltage $U_{ALC}$, $U_{AGC}$ and/or $U_{ACC}$ to be produced, is taken to control the output or voltage signal of blocks 20, 40, 10 and/or 50 to such state that the load signal voltage $U_{LOAD}$, as rail signal voltage is constant or almost constant.

The invention claimed is:

1. Method in a low voltage net data transmission system for keeping a load signal voltage constant at a location,
   in which method a coupling device for making the load signal voltage constant comprises:
      a signal amplifier,
      a supply voltage source for the signal amplifier,
      one of a low pass or band pass filter,
      a coupling unit for connecting to an electric network,
      a connecting cable having a length and a series impedance,
      a measuring and handling unit of transmitted signals for a storage location determination,
      a process unit including a sample and holding circuit and control circuits to produce a control signal with a signal producer,
   characterized in that in the method
      a feedback signal from the location is lead to the measuring and handling unit of the transmitted signals and further to the process unit including the sample and holding circuit and the control circuits, and
      the control signal of the process unit is further taken to steer the following: the supply voltage source for the signal amplifier, the signal amplifier, the one of the low pass or band pass filter, and the coupling unit for connecting to the electric network, in such a depending way that from one of the load impedance, the series impedance of the connecting cable or the frequency, load signal voltage is kept almost constant.

2. Method according to claim 1, characterized in that in the method a reference transmission signal of an output signal voltage of the signal amplifier is of constant short duration of 2 ms-20 s and is transmitted, and, by feedback signals measured from different points on one of a transmitter or a supply cable and from a drawn up memory map, a control voltage is determined, by use of which control voltage the output signal voltage of the signal amplifier reaches a predefined value so that a load transmission signal in the location is almost constant.

3. Method according to claim 1, wherein the signal producer includes a signal memory map.

4. Method in a low voltage electric net data transmission system for keeping a load signal voltage during transmitting constant on a location,
  in which method a coupling device for making the load signal voltage constant comprises:
    a signal amplifier,
    a supply voltage source for the signal amplifier,
    one of a low pass or band pass filter,
    a coupling unit,
    a connecting cable, having a length, and a series impedance,
    a coupling unit/feedback,
    an ALC/AGC/ACC unit producing control signals to control one of an output voltage of the supply voltage source or an output signal voltage of the signal amplifier or filter or coupling unit so that the load signal voltage is kept constant or almost constant,
  characterized in that in the method
    a location signal is elected to be a feedback signal which is taken by the coupling unit/feedback to the ALC/AGC/ACC unit for generating control signals,
    by which feedback signal the signal amplifier, the supply voltage source for the signal amplifier, the one of a low pass or band pass filter, and the coupling unit are steered in a depending way from the load impedance of the connecting cable having the length and the series impedance and a frequency, so that the load signal voltage during transmitting is essentially constant on the location.

* * * * *